(12) United States Patent
Bennett

(10) Patent No.: US 10,935,117 B1
(45) Date of Patent: *Mar. 2, 2021

(54) MODULAR DRIVE UNIT

(71) Applicant: Hydro-Gear Limited Partnership, Sullivan, IL (US)

(72) Inventor: Michael L. Bennett, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,282

(22) Filed: Aug. 12, 2019

Related U.S. Application Data

(63) Continuation of application No. 15/615,977, filed on Jun. 7, 2017, now Pat. No. 10,378,630, which is a continuation of application No. 14/921,133, filed on Oct. 23, 2015, now Pat. No. 9,677,653.

(60) Provisional application No. 62/067,787, filed on Oct. 23, 2014.

(51) Int. Cl.
*F16H 39/08* (2006.01)
*F16H 39/14* (2006.01)
*F16H 61/437* (2010.01)
*F16H 61/42* (2010.01)
*B60K 17/10* (2006.01)
*E01H 5/04* (2006.01)

(52) U.S. Cl.
CPC ........... *F16H 39/08* (2013.01); *B60K 17/105* (2013.01); *F16H 39/14* (2013.01); *F16H 61/42* (2013.01); *F16H 61/437* (2013.01); *E01H 5/04* (2013.01)

(58) Field of Classification Search
CPC .......... F16H 61/42; F16H 39/08; F16H 39/14; B60K 17/105
USPC .......................... 60/464, 485, 487; 74/606 R
See application file for complete search history.

(56) References Cited

U.S. PATENT DOCUMENTS

| | | | |
|---|---|---|---|
| 3,360,933 A | 1/1968 | Swanson et al. | |
| 3,643,433 A * | 2/1972 | Widmaier | F16H 39/08 60/486 |
| 4,856,368 A | 8/1989 | Fujisaki et al. | |
| 4,891,943 A | 1/1990 | Okada | |
| 4,893,524 A * | 1/1990 | Ohashi | B60K 17/105 475/83 |
| 4,899,541 A | 2/1990 | Okada et al. | |
| 4,905,472 A * | 3/1990 | Okada | B60K 17/105 180/307 |
| 4,922,787 A | 5/1990 | Fujisaki et al. | |
| 5,046,994 A | 9/1991 | Hasegawa et al. | |
| 5,142,940 A | 9/1992 | Hasegawa | |
| 5,163,293 A * | 11/1992 | Azuma | B60K 17/105 60/487 |

(Continued)

FOREIGN PATENT DOCUMENTS

EP 2591989 5/2013

*Primary Examiner* — Dustin T Nguyen
(74) *Attorney, Agent, or Firm* — Neal, Gerber & Eisenberg LLP

(57) ABSTRACT

A hydrostatic transmission assembly includes a first housing member and a housing cap sealed to the first housing member to form a sump wherein a pump and motor are rotatably disposed. A pump mount is located in the sump and engaged to the housing cap. The housing cap also includes a motor mount for an axial piston motor, and hydraulic fluid passages for connecting the pump to the motor. A pocket is located in the housing cap to rotationally support a swash plate for the pump.

15 Claims, 7 Drawing Sheets

(56) References Cited

U.S. PATENT DOCUMENTS

| | | |
|---|---|---|
| 5,203,169 A | 4/1993 | Ishii et al. |
| 5,211,077 A * | 5/1993 | Louis .................. B60K 17/105 180/53.1 |
| 5,259,193 A | 11/1993 | Maesaka et al. |
| 5,277,270 A | 1/1994 | Hasegawa |
| 5,412,947 A * | 5/1995 | Hirose ................. B60K 17/105 60/454 |
| 5,979,270 A | 11/1999 | Thoma et al. |
| 6,301,885 B1 | 10/2001 | Johnson et al. |
| 6,343,471 B1 | 2/2002 | Thoma et al. |
| 6,354,975 B1 | 3/2002 | Thomas |
| 6,449,349 B1 | 9/2002 | Higuchi |
| 6,775,976 B1 | 8/2004 | Phanco et al. |
| 7,040,092 B1 | 5/2006 | Buescher |
| 7,497,082 B1 | 3/2009 | Bennett et al. |
| 7,739,870 B2 | 6/2010 | Carlson et al. |
| 8,291,702 B2 | 10/2012 | Mochizuki |
| 8,534,060 B1 * | 9/2013 | Bennett .................... F16D 1/10 60/458 |
| 8,997,480 B1 * | 4/2015 | Bennett ................. B60K 17/10 60/487 |
| 9,151,374 B2 | 10/2015 | Richardson et al. |
| 9,664,270 B1 * | 5/2017 | Langenfeld ............. F16H 39/10 |
| 10,167,937 B2 * | 1/2019 | Crosby ................... F16H 39/12 |
| 2002/0157392 A1 * | 10/2002 | Johnson ................ F16H 61/437 60/468 |
| 2002/0170384 A1 | 11/2002 | Boyer et al. |

* cited by examiner

US 10,935,117 B1

MODULAR DRIVE UNIT

CROSS-REFERENCE TO RELATED APPLICATIONS

This application is a continuation of U.S. patent application Ser. No. 15/615,977, filed on Jun. 7, 2017, which is a continuation of U.S. patent application Ser. No. 14/921,133, filed on Oct. 23, 2015, which claims the benefit of U.S. Provisional Application No. 62/067,787, filed on Oct. 23, 2014. These prior applications are incorporated herein by reference in their entirety.

BACKGROUND OF THE INVENTION

This application relates to a hydrostatic drive apparatus generally, and in particular to a compact drive unit that provides modularity and interchangeability of features within the unit. The transaxle is intended for use in driving a vehicle or other powered machine or apparatus.

SUMMARY OF THE INVENTION

An improved hydrostatic transaxle providing a compact unit and modular interchangeability of internal components is disclosed herein, as described in more detail below. The transaxle, which minimizes components and simplifies construction and assembly, can be mounted on a vehicle or other powered machine or apparatus. An exemplary snow thrower incorporating the transaxle is depicted herein.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
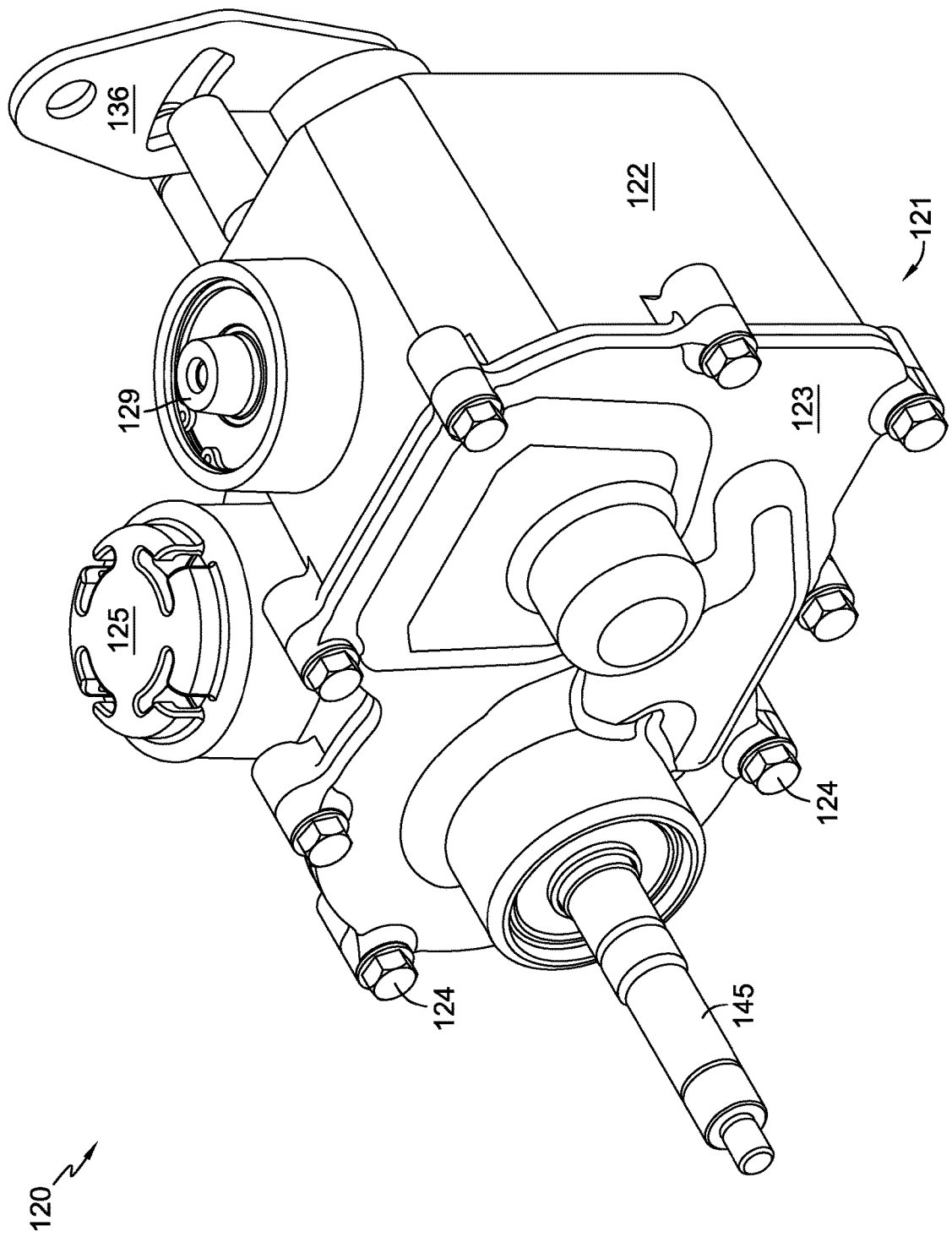
FIG. 1 is a perspective view of a first embodiment of a modular drive unit in accordance with the teachings herein.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles as taught herein and understood by one of ordinary skill in the art.

Figure 2:
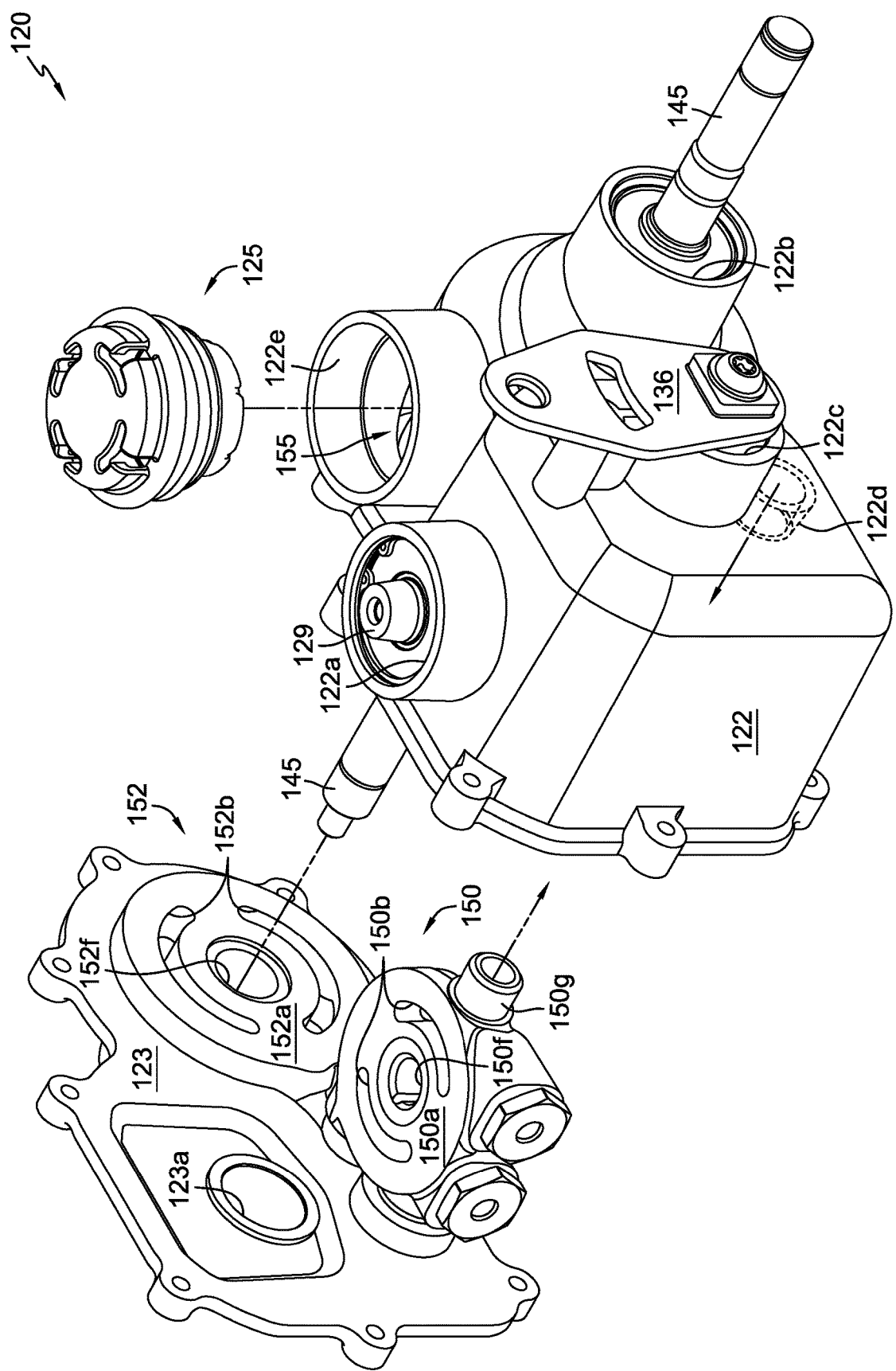
FIG. 2 is a partially exploded perspective view of the drive unit of FIG. 1.

FIGS. 1 and 2 depict a first embodiment of a drive unit, in this instance a hydrostatic transmission assembly 120. The housing 121 comprises a housing cap 123 secured to main housing 122 with fasteners 124. Fluid expansion diaphragm 125 is disposed in opening 122e of main housing 122 to permit fluid expansion from the internal sump 155. Motor output shaft 145 extends through both housing cap 123 and main housing 122 to be accessible from either side of transmission assembly 120. Openings 152f and 122b are provided in housing cap 123 and main housing 122, respectively, for supporting the motor output shaft 145 with appropriate bearings and seals. Pump input shaft 129 also extends through opening 122a in main housing 122 and may have a pulley (not shown) fixed thereon capable of receiving a drive belt (not shown).

Figure 3:
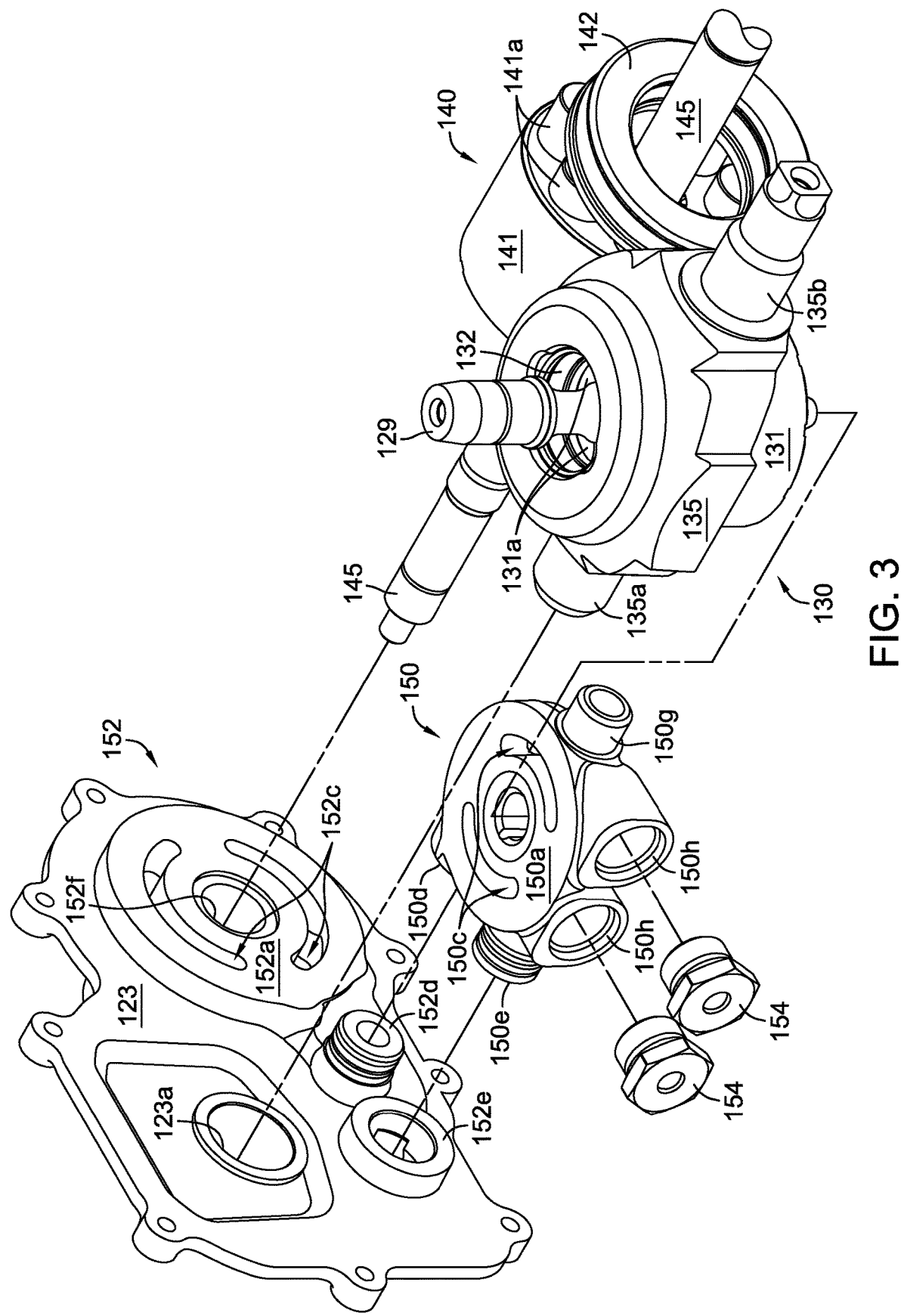
FIG. 3 is a partially exploded perspective view of a portion of the drive unit of FIG. 2 with certain components removed for clarity.
Figure 5:
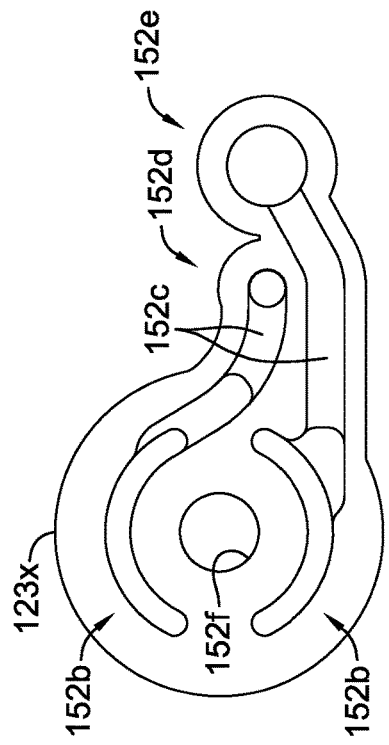
FIG. 5 is a plan view of the housing cap along the line 5-5 in FIG. 4.
Figure 6:
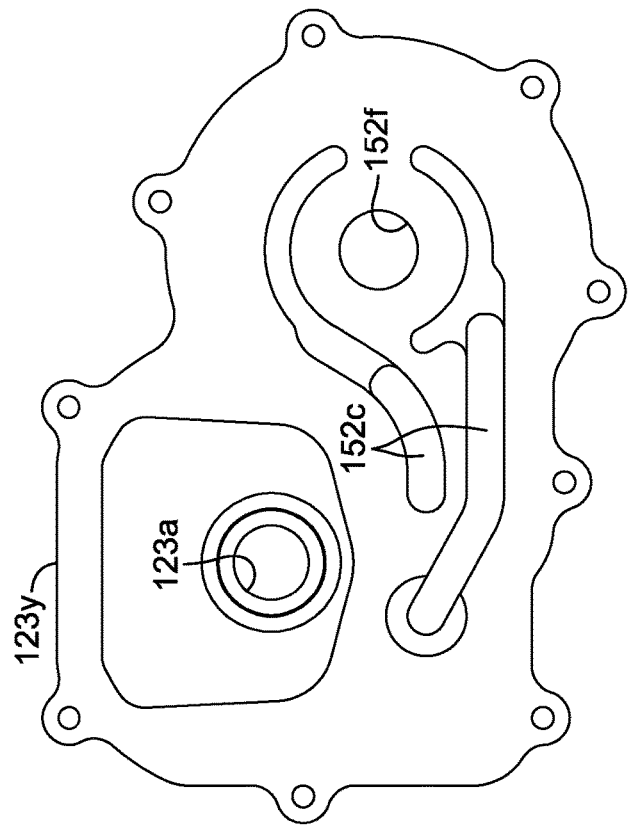
FIG. 6 is a plan view of the housing cap along the line 6-6 in FIG. 4.

In FIG. 2, housing cap 123 is shown exploded from main housing 122, and without either of the cylinder blocks disposed thereon for clarity, and FIG. 3 shows the separate pump cylinder block 131 and pump pistons 131a of axial piston pump 130, along with motor cylinder block 141, motor pistons 141a and motor thrust bearing 142 of axial piston motor 140. Pump pistons 131a bear against pump thrust bearing 132 which is supported in swash plate 135. As can be seen most clearly in FIGS. 4-6, housing cap 123 includes hydraulic porting therein to connect motor mount 152 with pump mount 150, and in particular fluid passages 152c. Motor mount 152 includes a pair of kidney ports 152b disposed on motor running surface 152a, and connected to fluid passages 152c. Motor cylinder block 141 is rotatably disposed on motor running surface 152a to permit fluid communication between the internal volume of motor pistons 141a and kidney ports 152b. Similarly, pump mount 150 includes a pair of corresponding kidney ports 150b also connected to fluid passages 150c and located on pump running surface 150a, and pump cylinder block 131 is rotatably disposed on pump running surface 150a to permit fluid communication between the internal volume of pump pistons 131a and kidney ports 150b. It will be understood that cylinder blocks 131 and 141 may be directly disposed on their respective running surfaces 150a, 152a, or they may be disposed on a separate running surface element supported on the running surface, such as a valve plate (not shown). Pump running surface 150a is disposed generally orthogonal to motor running surface 152a. Fluid passages 150c are connected to fluid passages 152c formed in housing cap 123, as described below. A pair of check valves 154 may be disposed in a pair of check valve ports 150*h* formed in pump mount 150 and operate in connection with the internal hydraulic porting and the internal sump 155 in a known manner.

In the embodiment depicted in FIGS. 2 and 3, pump mount 150 is modularly detachable from housing cap 123, as shown in FIG. 3 in particular. A pair of receiving ports 152*d* and 152*e* are formed on housing cap 123 and a corresponding pair of connecting ports 150*d* and 150*e* are formed on pump mount 150. These sets of ports permit the use of pump mounts having different sized running surfaces. For example, a pump mount having a running surface sized to accommodate a 10 cc pump could be replaced with a different pump mount having a running surface sized to accommodate a 12 cc pump, where either pump could be paired with, for example, a 16 cc or 21 cc motor. The fluid passages 152*c* would be able to accommodate pumps of either size, so only the pump mount need be changed. These ports are depicted in this embodiment as having one female port and one male port connector on each portion, with receiving ports 152*d* and 150*e* depicted as being male connectors. This arrangement simplifies machining of the parts, but it will be understood that one could form both male connectors on either housing cap 123 or pump mount 150 such that either the ports 152*d*, 152*e* or the ports 150*d*, 150*e*, are both male, depending on the application. It will also be understood that the use of the terms "connecting" and "receiving" are merely for convenience of understanding the disclosure.

Figure 4:
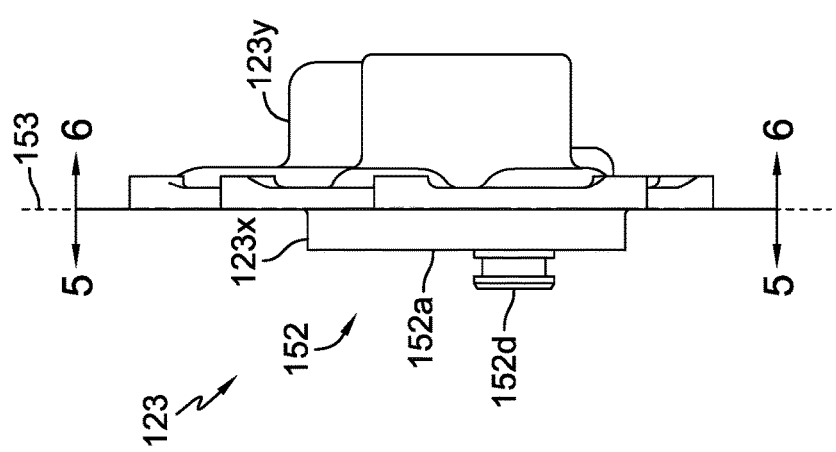
FIG. 4 is a plan view of the housing cap shown in FIG. 3.
Figure 7:
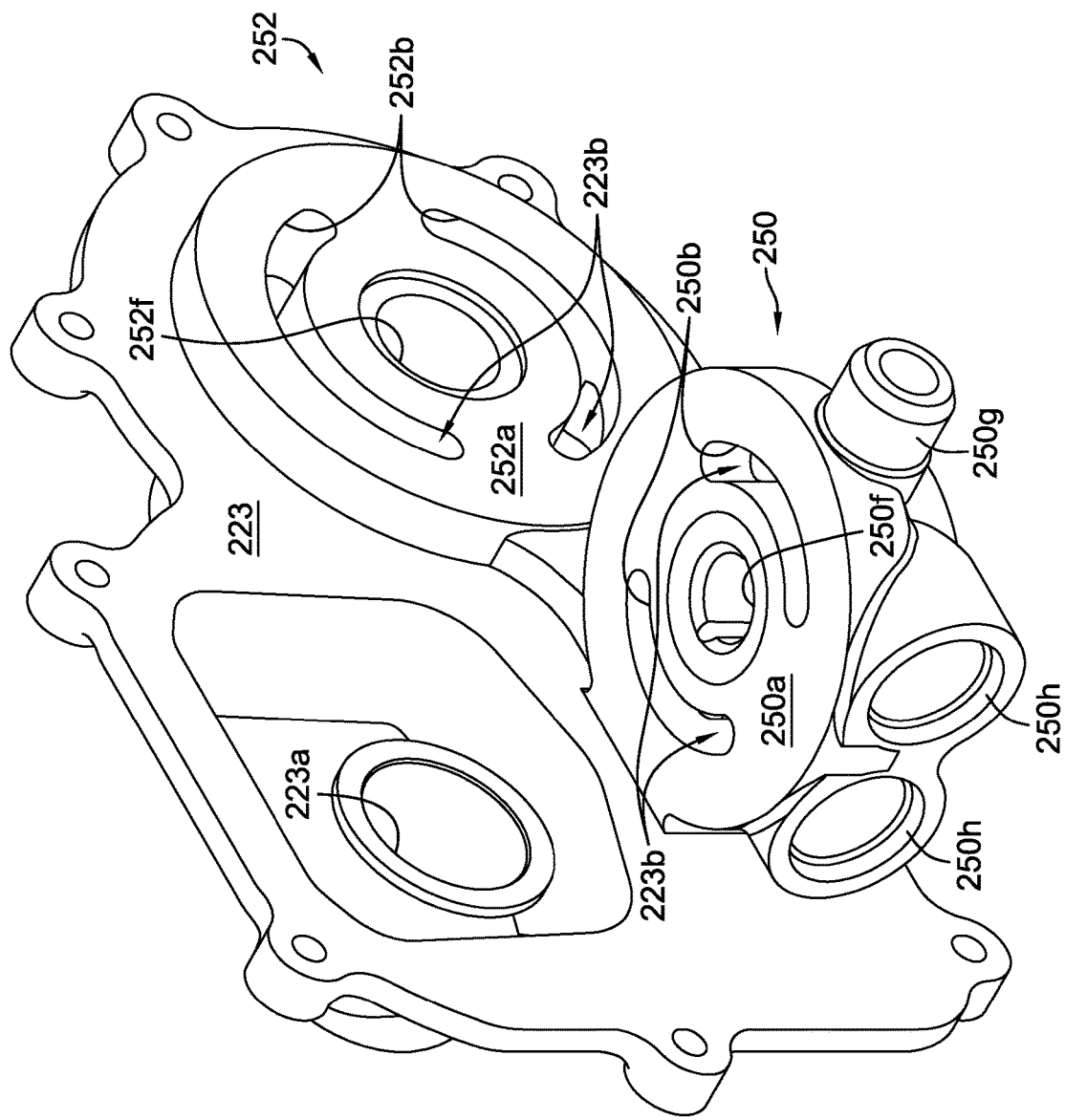
FIG. 7 is a perspective view of an alternative embodiment of the housing cap.
Figure 9:
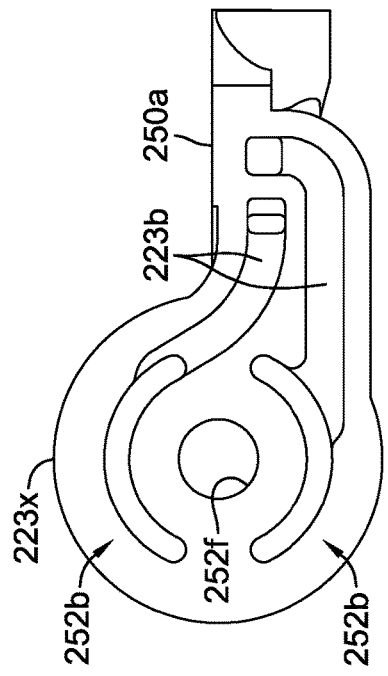
FIG. 9 is a plan view of a first portion of the housing cap along the line 9-9 in FIG. 8.
Figure 10:
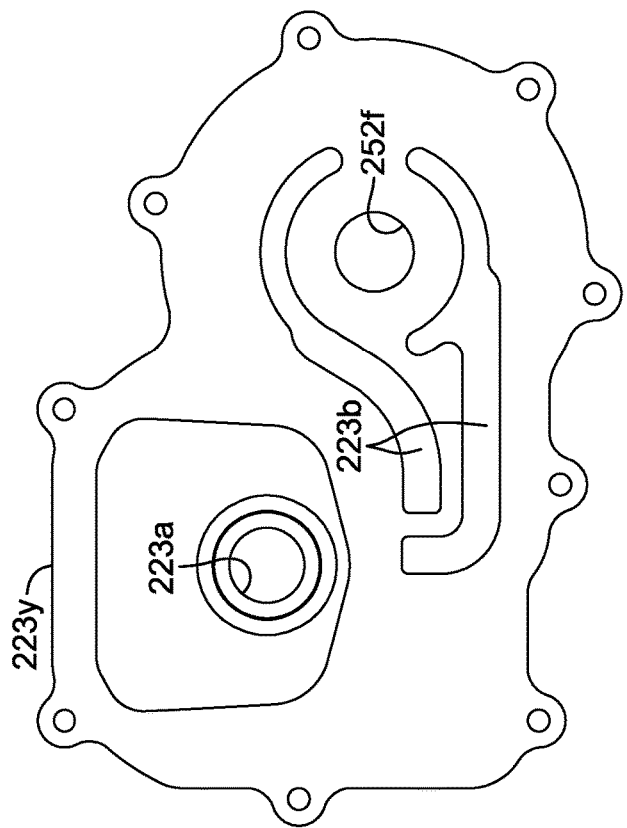
FIG. 10 is a plan view of a second portion of the housing cap along the line 10-10 in FIG. 8.

The complex geometry of this casting required for this unit can be created using the lost foam method where certain foam components are glued together prior to casting. For example, as shown in FIG. 4, housing cap 123 may be made by combining motor mount portion 123*x* with housing cap portion 123*y* along glue line or glue joint 153.

A projection 150*g* is formed on pump mount 150 on a side opposite the connecting ports 150*d*, 150*e*, and acts as a locating and supporting feature to support pump mount 150 by interaction with an internal pocket 122*d* formed on an internal surface of main housing 122. An opening 150*f* is also formed in pump mount 150 to provide support for the pump input shaft 129.

A trunnion mounted swash plate 135 is also provided, with a first trunnion 135*a* extending from one side thereof and being supported in trunnion support pocket 123*a* formed in housing cap 123, and a second trunnion 135*b* supported in the trunnion pocket 122*c* and connected to control arm 136. This use of the housing cap 123 to also support the trunnion simplifies construction and makes for a more compact unit. As seen in, e.g. FIG. 3, pump input shaft 129 has a longitudinal axis of rotation that intersects the longitudinal axis of rotation of first trunnion 135*a* and second trunnion 135*b*.

Figure 8:
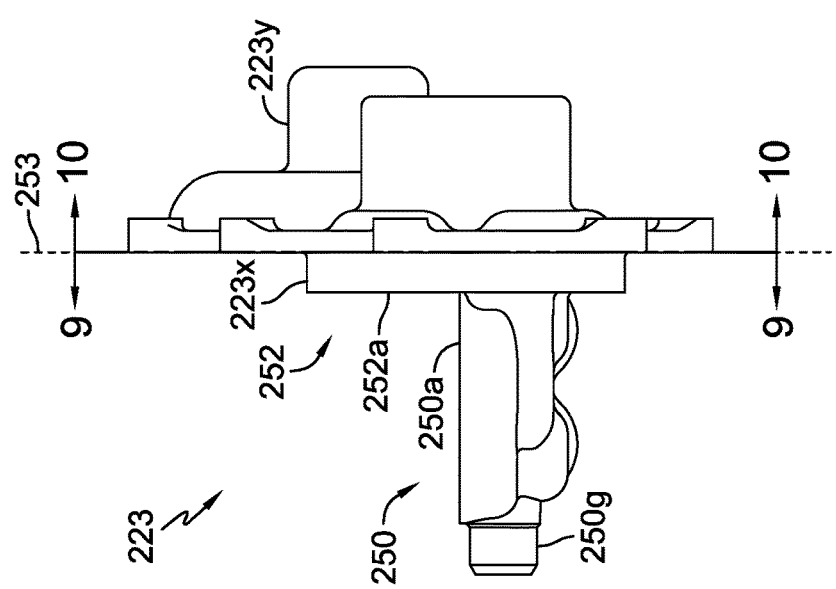
FIG. 8 is a plan view of the housing cap shown in FIG. 3.

A second embodiment is depicted in FIGS. 7-10, where the housing cap 223 has a pump mount 250 integrally formed thereon, rather than being modularly detachable. As in the prior embodiment, the complex geometry required for this unit can be created using the lost foam method where certain foam components are glued together prior to casting. For example, as shown in FIG. 8, housing cap 223 can be made by combining the pump and motor mount portion 223*x* that includes both the pump mount 250 and the motor mount 252, with housing cap portion 223*y* along glue line 253. In this second embodiment, fluid passages 223*b* are formed entirely in one component, housing cap 223, rather than being formed in two separate components as in the prior embodiment. Compared to the joined fluid passages 150*c*, 152*c* of the first embodiment, fluid passages 223*b* are of a slightly different shape and connect kidney ports 250*b* directly with kidney ports 252*b* without the use of connecting ports. Other aspects of the second embodiment can be functionally identical as those elements previously described and are given a reference numeral similar to the previous description with the prefix "2" rather than the previous "1."

Figure 11:
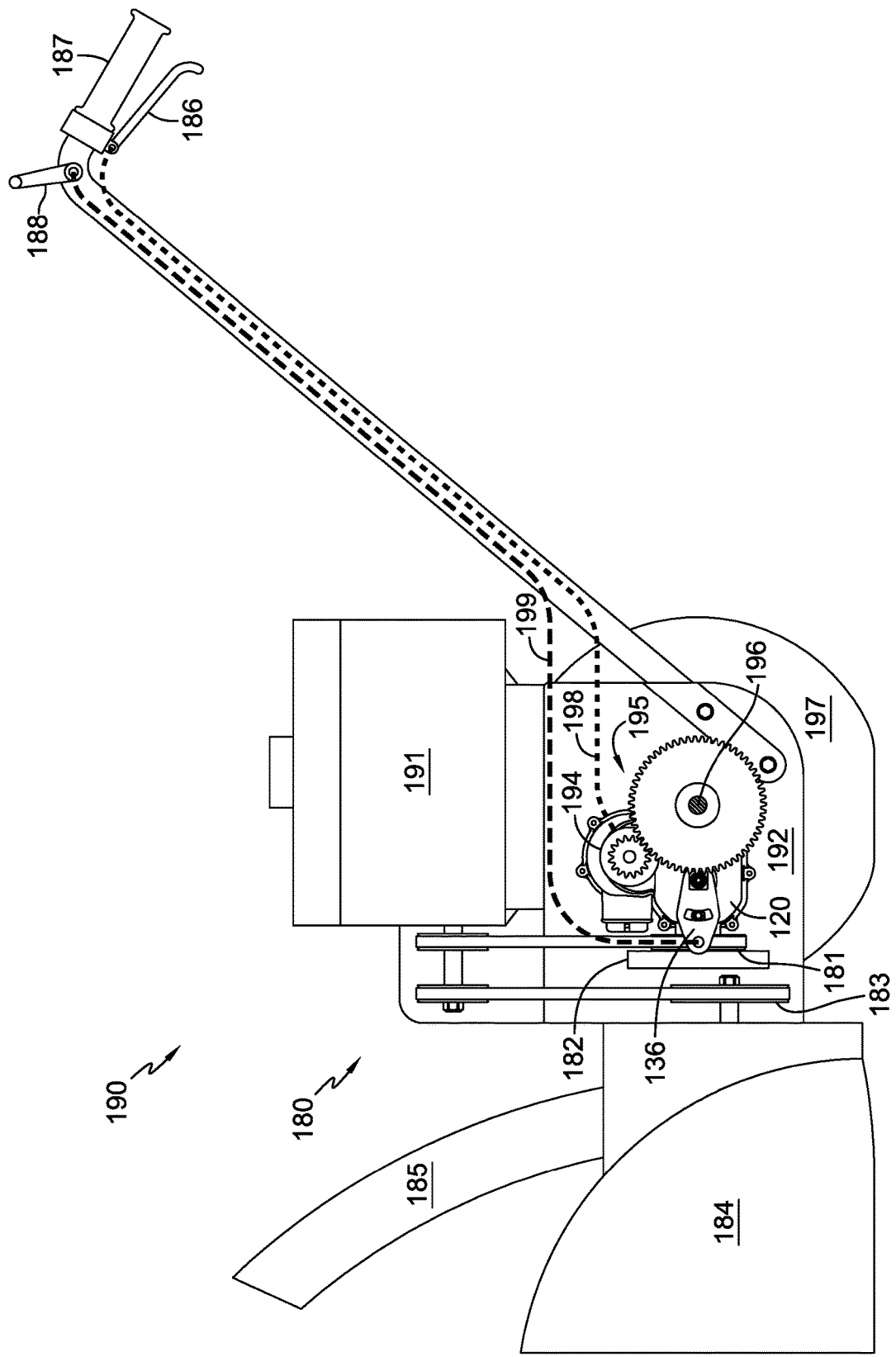
FIG. 11 is a partially schematic elevational view of an exemplary vehicle utilizing the drive unit of FIG. 1.

The various embodiments disclosed herein may be used in a vehicle 190 similar to that shown in FIG. 11, which is shown here as a snow thrower. Only one side of vehicle 190 is shown, but it will be understood that where appropriate, the structure on the opposite side can be identical to that depicted and described herein. One wheel 197 has been removed to more clearly show certain features. It will be understood that vehicle 190 is exemplary and other vehicle applications can be used in connection with the teachings herein. Vehicle 190 is powered by a prime mover 191, which may be an internal combustion engine, electrically powered motor or the like. Prime mover 191 may be connected to various powered systems on vehicle 190 by a pulley and belt system 180. In this depicted embodiment, transmission assembly 120 is mounted so that input shaft 129 is parallel to the ground, and a first driven pulley 181 is mounted on input shaft 129 to power the transmission assembly 120. A fan 182 may also be mounted on input shaft 129 or pulley 181 for cooling the transmission assembly 120.

A pair of steering clutches 194 are disposed external to transmission assembly 120 and are driven by motor output shaft 145 in a known manner, to provide power to a pair of reduction gearing assemblies 195, which in turn power a pair of output axles 196. Each output axle 196 is engaged to and drives a wheel 197. Another driven pulley 183 may power a device such as a snow thrower 184 having chute 185. The aforementioned elements may be supported directly or indirectly on a frame 192.

Vehicle 190 may also have various controls located adjacent to hand grips 187 to be operable by an operator. Such controls may include a pair of levers or clutch handles 186 to engage steering clutches 194 through linkages 198. A speed and direction control lever 188 is connected to control arm 136 through linkage 199. In other embodiments, other linkages may be used to control the output of transmission assembly 120, and additional controls may be provided to control engagement of snow thrower 184, the direction of chute 185, engine throttle (not shown) and other features related to the operation of vehicle 190.

While one or more specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of any appended claims and any equivalent thereof.

What is claimed is:

1. A transmission assembly comprising:
   a housing comprising a first housing member joined to a cap to form an internal sump, wherein the first housing member comprises a first opening and an internal pocket, and the cap comprises:
   a first kidney port disposed on a motor running surface;
   a second kidney port disposed on the motor running surface;
   a first fluid passage in fluid communication with the first kidney port;

a second fluid passage in fluid communication with the second kidney port; and
a second opening;
a pump mount engaged with the cap, wherein the pump mount comprises a projection engaged with the internal pocket, a third kidney port disposed on a pump running surface and in fluid communication with the first fluid passage, and a fourth kidney port disposed on the pump running surface and in communication with the second fluid passage;
a hydraulic pump disposed on the pump running surface entirely within the first housing member, the hydraulic pump being driven by a pump input shaft; and
a hydraulic motor disposed on the motor running surface and driving a motor output shaft, wherein the motor output shaft extends through the first opening in the first housing member and through the second opening in the cap.

2. The transmission assembly of claim 1, wherein the hydraulic pump is an axial piston pump comprising a pump cylinder block rotatably engaged with the pump running surface; and the hydraulic motor is an axial piston motor comprising a motor cylinder block rotatably engaged with the motor running surface.

3. The transmission assembly of claim 2, wherein the pump input shaft extends through a third opening formed in the first housing member.

4. The transmission assembly of claim 2, further comprising a trunnion pocket formed in the cap, and a swash plate engaged with the axial piston pump, the swash plate comprising a first trunnion engaged with the trunnion pocket.

5. The transmission assembly of claim 2, further comprising a motor thrust bearing of the axial piston motor that is disposed within the housing and through which the motor output shaft extends.

6. A transmission assembly comprising:
a housing comprising a first housing member joined to a cap to form an internal sump, wherein the first housing member comprises a first opening, wherein a trunnion pocket is formed in the cap, and wherein the cap comprises:
a first kidney port disposed on a motor running surface;
a second kidney port disposed on the motor running surface;
a first fluid passage in fluid communication with the first kidney port;
a second fluid passage in fluid communication with the second kidney port; and
a second opening;
a pump mount engaged with the cap and comprising a third kidney port disposed on a pump running surface and in fluid communication with the first fluid passage and the pump mount further comprising a fourth kidney port disposed on the pump running surface and in communication with the second fluid passage;
a hydraulic pump disposed on the pump running surface entirely within the first housing member, the hydraulic pump being driven by a pump input shaft, wherein the hydraulic pump is an axial piston pump comprising a pump cylinder block rotatably engaged with the pump running surface;
a swash plate engaged with the axial piston pump, wherein the swash plate comprises a first trunnion engaged with the trunnion pocket; and
a hydraulic motor disposed on the motor running surface and driving a motor output shaft, wherein the hydraulic motor is an axial piston motor comprising a motor cylinder block rotatably engaged with the motor running surface, wherein the motor output shaft extends through the first opening in the first housing member and through the second opening in the cap.

7. The transmission assembly of claim 6, wherein the pump input shaft extends through a third opening formed in the first housing member.

8. The transmission assembly of claim 6, further comprising a motor thrust bearing of the axial piston motor that is disposed within the housing and through which the motor output shaft extends.

9. A transmission assembly of a snow thrower that comprises a prime mover, at least one wheel, and at least one axle, wherein the transmission assembly comprises:
a main housing defining an internal pocket;
a housing cap sealed to the main housing to form a sump;
an axial piston pump comprising a plurality of pump pistons, and an input shaft that is configured to be driven by the prime mover to power the transmission assembly;
a pump mount disposed in the sump, wherein the pump mount comprises a pump running surface for the axial piston pump and a projection received by the internal pocket;
a swash plate engaged with the plurality of pump pistons;
an axial piston motor comprising a motor output shaft that is configured to drive the at least one axle that rotates the at least one wheel to effect movement of the snow thrower; and
a motor mount located on the housing cap and comprising a motor running surface for the axial piston motor.

10. The transmission assembly of claim 9, wherein the axial piston pump further comprises a pump cylinder block rotatably engaged with the pump running surface.

11. The transmission assembly of claim 10, wherein the axial piston motor further comprises a motor cylinder block rotatably engaged with the motor running surface.

12. The transmission assembly of claim 11, further comprising a trunnion pocket formed in the housing cap.

13. The transmission assembly of claim 12, wherein the swash plate comprises a first trunnion engaged with the trunnion pocket.

14. The transmission assembly of claim 9, further comprising at least one reduction assembly, wherein the motor output shaft is configured to power the at least one axle via the at least one reduction assembly.

15. The transmission assembly of claim 9, further comprising at least one steering clutch that is configured to adjust powering of the at least one axle by the motor output shaft.

* * * * *